(12) United States Patent
Hall et al.

(10) Patent No.: US 7,912,094 B2
(45) Date of Patent: Mar. 22, 2011

(54) SELF-CHECKING PAIR-BASED MASTER/FOLLOWER CLOCK SYNCHRONIZATION

(75) Inventors: Brendan Hall, Eden Prairie, MN (US); Michael Paulitsch, Columbia Heights, MN (US); Kevin R. Driscoll, Maple Grove, MN (US)

(73) Assignee: Honeywell International Inc., Morristown, NJ (US)

(*) Notice: Subject to any disclaimer, the term of this patent is extended or adjusted under 35 U.S.C. 154(b) by 734 days.

(21) Appl. No.: 11/610,454

(22) Filed: Dec. 13, 2006

(65) Prior Publication Data
US 2008/0144668 A1 Jun. 19, 2008

(51) Int. Cl.
H04J 3/06 (2006.01)
(52) U.S. Cl. .................... 370/508; 709/248
(58) Field of Classification Search .......... 370/464, 370/498, 503, 351, 389, 395.1, 395.2, 395.21; 340/825, 825.2; 375/354, 355, 356, 357, 375/358, 359; 455/7, 11.1, 12.1, 13.2; 709/248
See application file for complete search history.

(56) References Cited

U.S. PATENT DOCUMENTS

| | | |
|---|---|---|
| 4,417,334 A | 11/1983 | Gunderson et al. |
| 4,428,046 A | 1/1984 | Chari et al. |
| 4,630,254 A | 12/1986 | Tseng |
| 4,631,718 A | 12/1986 | Miyao |
| 4,733,391 A | 3/1988 | Godbold et al. |
| 4,740,958 A | 4/1988 | Duxbury et al. |
| 4,856,023 A | 8/1989 | Singh |
| 4,866,606 A | 9/1989 | Kopetz |
| 4,905,230 A | 2/1990 | Madge et al. |
| 5,132,962 A | 7/1992 | Hobgood et al. |
| 5,161,153 A | 11/1992 | Westmore |
| 5,235,595 A | 8/1993 | O'Dowd |
| 5,257,266 A | 10/1993 | Maki |
| 5,307,409 A | 4/1994 | Driscoll |
| 5,341,232 A | 8/1994 | Popp |

(Continued)

FOREIGN PATENT DOCUMENTS
AT 407582 B 4/2001
(Continued)

OTHER PUBLICATIONS

Al-Rousan et al., "The Two-Processor Reliability of Hierarchical Larg-Scale Ring-Based Networks", "Proceedings of the 29th Hawaii International Conference on System Sciences", 1996, pp. 63-71.

(Continued)

Primary Examiner — Seema S Rao
Assistant Examiner — Khoa Huynh
(74) Attorney, Agent, or Firm — Fogg & Powers LLC

(57) ABSTRACT

Systems and methods for network clock synchronization are provided. In one embodiment, a method for clock synchronization in a braided ring network comprises: providing a schedule for a braided ring network comprising a plurality of nodes, wherein at least two nodes comprise a self-checking pair of a first node and a second node, the first node performing a method comprising: determining when a first rendezvous message is received from the second node; when the second rendezvous message is received, calculating a time difference between the send instance of the first rendezvous message and a local time; when the time difference is not greater than a reference bound, calculating a sending point for transmitting a synchronization message, wherein the sending point is calculated based on the time difference; and selectively sending the synchronization message to the braided ring network when the sending point is reached based on the time difference.

13 Claims, 4 Drawing Sheets

U.S. PATENT DOCUMENTS

| | | | |
|---|---|---|---|
| 5,383,191 A | 1/1995 | Hobgood et al. | |
| 5,386,424 A | 1/1995 | Driscoll et al. | |
| 5,394,401 A | 2/1995 | Patrick et al. | |
| 5,463,634 A | 10/1995 | Smith et al. | |
| 5,557,778 A | 9/1996 | Vaillancourt | |
| 5,566,180 A * | 10/1996 | Eidson et al. | 370/473 |
| 5,687,356 A | 11/1997 | Basso et al. | |
| 5,715,391 A | 2/1998 | Jackson et al. | |
| 5,734,687 A * | 3/1998 | Kainulainen | 375/357 |
| 5,742,646 A | 4/1998 | Woolley et al. | |
| 5,896,508 A | 4/1999 | Lee | |
| 5,903,565 A | 5/1999 | Neuhaus et al. | |
| 5,920,267 A | 7/1999 | Tattersall et al. | |
| 5,937,414 A * | 8/1999 | Souder et al. | 707/203 |
| 5,940,367 A | 8/1999 | Antonov | |
| 6,052,753 A | 4/2000 | Doerenberg et al. | |
| 6,172,984 B1 | 1/2001 | Beyda et al. | |
| 6,175,553 B1 | 1/2001 | Luk et al. | |
| 6,219,528 B1 | 4/2001 | Wright et al. | |
| 6,226,676 B1 | 5/2001 | Crump et al. | |
| 6,374,078 B1 | 4/2002 | Williams et al. | |
| 6,414,953 B1 | 7/2002 | Lamarche et al. | |
| 6,513,092 B1 | 1/2003 | Gorshe | |
| 6,594,802 B1 | 7/2003 | Ricchetti et al. | |
| 6,618,359 B1 | 9/2003 | Chen et al. | |
| 6,707,913 B1 | 3/2004 | Harrison et al. | |
| 6,741,559 B1 | 5/2004 | Smeulderse et al. | |
| 6,760,768 B2 | 7/2004 | Holden et al. | |
| 6,765,924 B1 | 7/2004 | Wu et al. | |
| 6,842,617 B2 | 1/2005 | Williams et al. | |
| 6,925,497 B1 | 8/2005 | Vetrivelkumaran et al. | |
| 6,956,461 B2 | 10/2005 | Yoon et al. | |
| 6,967,936 B1 * | 11/2005 | Laroia et al. | 370/329 |
| 7,035,539 B2 | 4/2006 | Gumaste | |
| 7,050,395 B1 | 5/2006 | Chow et al. | |
| 7,085,560 B2 | 8/2006 | Petermann | |
| 7,088,921 B1 | 8/2006 | Wood | |
| 7,269,177 B2 | 9/2007 | Baker | |
| 7,349,414 B2 | 3/2008 | Sandstrom | |
| 7,372,859 B2 | 5/2008 | Hall et al. | |
| 7,457,303 B2 | 11/2008 | Blumrich et al. | |
| 7,502,334 B2 | 3/2009 | Hall et al. | |
| 2002/0027877 A1 | 3/2002 | Son et al. | |
| 2002/0087763 A1 | 7/2002 | Wendorff | |
| 2002/0118636 A1 | 8/2002 | Phelps et al. | |
| 2003/0002435 A1 | 1/2003 | Miller | |
| 2003/0067867 A1 | 4/2003 | Weis | |
| 2003/0123491 A1 * | 7/2003 | Couillard | 370/508 |
| 2003/0128984 A1 | 7/2003 | Oberg et al. | |
| 2004/0073698 A1 | 4/2004 | Harter et al. | |
| 2004/0223515 A1 * | 11/2004 | Rygielski et al. | 370/503 |
| 2004/0258097 A1 * | 12/2004 | Arnold et al. | 370/503 |
| 2005/0002332 A1 | 1/2005 | Oh | |
| 2005/0132105 A1 | 6/2005 | Hall et al. | |
| 2005/0135277 A1 | 6/2005 | Hall et al. | |
| 2005/0135278 A1 | 6/2005 | Hall et al. | |
| 2005/0152377 A1 | 7/2005 | Hall et al. | |
| 2005/0152379 A1 * | 7/2005 | Hall et al. | 370/400 |
| 2005/0169296 A1 | 8/2005 | Katar et al. | |
| 2005/0198280 A1 | 9/2005 | Hall et al. | |
| 2006/0077981 A1 * | 4/2006 | Rogers | 370/395.21 |
| 2006/0203851 A1 * | 9/2006 | Eidson | 370/503 |
| 2007/0116058 A1 * | 5/2007 | Rausch et al. | 370/503 |
| 2007/0189538 A1 * | 8/2007 | Lindteigen | 380/274 |
| 2008/0010705 A1 | 1/2008 | Quaid et al. | |
| 2008/0031283 A1 * | 2/2008 | Curran-Gray et al. | 370/503 |
| 2008/0080551 A1 | 4/2008 | Driscoll et al. | |
| 2008/0144526 A1 | 6/2008 | Hall et al. | |
| 2009/0086653 A1 | 4/2009 | Driscoll et al. | |

FOREIGN PATENT DOCUMENTS

| | | |
|---|---|---|
| DE | 3238692 | 4/1984 |
| DE | 0405706 | 2/1990 |
| DE | 19633744 | 2/1998 |
| DE | 20220280 | 11/2003 |
| EP | 1280024 | 1/2003 |
| EP | 1280312 | 1/2003 |
| EP | 1365543 | 11/2003 |
| EP | 1398710 | 3/2004 |
| EP | 1469627 | 10/2004 |
| GB | 2028062 | 2/1980 |
| GB | 1581803 | 12/1980 |
| GB | 2175775 | 12/1986 |
| WO | 0064122 | 10/2000 |

OTHER PUBLICATIONS

"Backplane Data Bus ARINC Specification 659", Dec. 1993, pp. 1-132, Publisher: ARINC.

Avizienis, "A Fault Tolerance Infrastructure for Dependable Computing With High-Performance COTS Componenets", "Conference Proceedings on Dependable Systems and Networks", Jun. 2000, pp. 492-500, Publisher: IEEE, Published in: New York, NY.

Bauer et al., "Assumption Coverage Under Different Failure Modes in the Time-Triggered Architecture", "8th IEEE International Conference on Emerging Technologies and Factory Automation", Oct. 2001, pp. 333-341, Publisher: IEEE.

Bauer et al., "Transparent Redundancy in the Time-Triggered Architecture", "Proceedings of the Conference on Dependable Systems and Networks", 2000, pp. 5-13, Publisher: IEEE.

Bauer et al., "The Central Guardian Approach to Enforce Fault Isolation in a Time-Triggered System", "Proceedings of Symposium on Autonomous Decentralized Systems", Apr. 2003, pp. 37-44, Publisher: IEEE.

Bosch, "Can Specification Version 2.0", "SAE Handbook—Parts and Components", 1998, pp. 1-72, vol. 2, Publisher: Society of Automotive Engineers.

D'Luna, "A Single-Chip Universal Cable Set-Top Box/Modern Transceiver", "Journal of Sold-State Circuits", Nov. 1998, pp. 1647-1660, vol. 34, No. 11, Publisher: IEEE.

Driscoll et al., "The Real Byzantine Generals", "Proceedings of Digital Avionics System Conference", Oct. 2004, pp. 6.D.4-1-6.D.4-11, Publisher: IEEE.

Brinkmeyer, "Flexray International Workshop Slides", "www.flexray-group.com", Apr. 2002, pp. 1-356, Publisher: Flexray.

"Flexray Communication System: Protocol Specification Version 2.1 Revision A", "www.flexray-group.com", Mar. 2006, pp. 1-8, Publisher: Flexray Consortium.

"Preliminary Node-Local Bus Guardian Specification Version 2.0.9", Dec. 2005, pp. 1-75, Publisher: Flexray Consortium.

"Preliminary Central Bus Guardian Specification Version 2.0.9", Dec. 2005, pp. 1-38, Publisher: Flexray Consortium.

Grnarov et al., "A Highly Reliable Distributed Loop Network Architecture", "Proceedings of Fault-Tolerant Computing Symposium", Jun. 1980, pp. 319-324, Publisher: IEEE.

Gruenbacher, "Fault Injection for TTA", 1999, Publisher: Information Society Technologies.

Hall et al., "Ringing Out Fault Tolerance a New Ring Network for Superior Low-Dost Dependabilitiy", "International Conference on Dependable Systems and Networks (DSN'05)", 2005, pp. 298-307.

Hammett et al., "Achieving 10-9 Dependability With Drive-By-Wire Systems", "SAE World Congress", 2003, pp. 534-547, vol. 112, No. 7, Publisher: Society of Automotive Engineers.

Hopper et al., "Design and Use of an Integrated Cambridge Ring", "Journal on Selected Areas in Communications", Nov. 2003, pp. 775-784, vol. 1, No. 5, Publisher: IEEE.

Hoyme et al., "SAFEbus", "Proceedings of the Digital Avionics Systems Conference", Oct. 1992, pp. 68-73, Publisher: IEEE.

Hoyme et al., "SAFEBUS", "IEEE Aerospce and Electronics Systems Magazine", Mar. 1993, pp. 34-39, vol. 8, No. 3, Publisher: IEEE.

Huber et al., "SILK: An Implementation of a Buffer Insertion Ring", "Journal on Selected Areas in Communications", Nov. 1983, pp. 766-774, vol. 1, No. 5, Publisher: IEEE.

Hwang et al., "Survival Reliability of Some Double-Loop Networks and Chordal Rings", "Transactions on Computers", 1995, pp. 1468-1471, vol. 44, No. 12, Publisher: IEEE.

"Internet Content Adaptation", "Network Appliance", Jul. 2001, pp. 1-13.

IEEE Computer Society, "1149.6 IEEE Standard for Boundary-Scan Testing of Advanced Digital Networks", Apr. 17, 2003, pp. 1-139, Publisher: IEEE, Published in: New York, NY.

Johansson et al., "On Communication Requirements for Control-by-Wire Applications", "Proceedings of System Safety Conference", Aug. 2003, pp. 1123-1132.

Kanoun et al., "Dependability Evalucation of Bus and Ring Communication Topologies for the Delta-4 Distr Fault-Tolerant Architecture", "Proceedings of the Symposium on Reliable Distributed Systems", 1991, pp. 130-141, Publisher: IEEE.

Kieckhafer et al., "The MAFT Architecture for Distributed Fault Tolerance", "Transactions on Computers", 1988, pp. 398-405, vol. 37, No. 4, Publisher: IEEE.

Kopetz et al., "TTP—A Protocol for Fault-Tolerant Real-Time Systems", "Computer", Jan. 1194, pp. 14-23, vol. 27, No. 1, Publisher: IEEE Computer Society, Published in: Long Beach, CA.

Liu et al., "The Distributed Double-Loop Computer Network (DDLCN)", "ACM '80 Proceedings of the ACM 1980 Annual Conference", 1980, pp. 164-178, Publisher: ACM.

Lonn, "Initialsynchronization of TDMA Communication in Distributed Real-Time Systems", "Conference on Distributed Computing Systems", 1999, pp. 370-379, Publisher: IEEE.

Nayak et al., "Ring Reconfiguration in Presence of Close Fault Cuts", "Proceedings of Hawaii International Conference on System Science", 1996, pp. 422-428, Publisher: IEEE.

Paulitsch et al., "Cverage and the Use of Cyclic Redundancy Codes in Ultra-Dependable Systems", "2005 International Conference on Dependable Systems and Networks (DSN'05)", 2005, pp. 346-355.

Poledna et al., "Replica Determinism and Flexible Scheduling in Hard Real-Time Dependable Systms", "IEEE Transactions on Computers", Feb. 2000, pp. 100-111, vol. 49, No. 2, Publisher: IEEE.

Poledna, "Replica Determinism in Distributed Real-Time Systems: A Brief Survey", "Real-Time Systems", 1994, pp. 289-316, vol. 6.

"Software Considerations in Airborne Systems and Equipment Certification", "http://www.rtca.org", Dec. 1992, pp. 1-112, Publisher: RTCA.DO-178b.

Rushby, "Bus Architectures for Safety-Critical Embedded Systems, Embedded Software", "Proceedings of 1st International Workshop on Embedded Software, Notes in Computer Science", Oct. 2001, pp. 306-323, vol. 2211, Publisher: Springer-Verlag, Published in: Germany.

Saltzer et al., "Why a Ring", "Proceedings of Symposium on Data Communications", 1981, pp. 211-217, Publisher: IEEE.

Sivencrona et al., "Protocol Membership Agreement in Distributed Communicaiton System-A Question of Brittleness", "SAE World Congress, Paper No. 2003-01-01028", 2003, pp. 1-6, Publisher: Society of Automotive Engineers Inc.

Steiner et al., "The Startup Problem in Fault-Tolerant Time-Triggered Communication", "International Conference on Dependable Systems and Networks (DSN'06)", 2006, pp. 35-44.

Steiner et al., "The Transition From Asynchronous to Synchronous System Operation: An Approach From Distributed Fault-Tolerant Systems", "Proceedings of Conference on Distributed Computing Systems", Jul. 2002, pp. 329-336, Publisher: IEEE.

Sundaram et al., "Controller Integrity in Automotive Failsafe System Architectures", "2006 SAE World Congress", 2006, pp. 1-10, Publisher: SAE International.

Tomlinson et al., "Extensible Proxy Services Framework", Jul. 2000, pp. 1-13, Publisher: Internet Society.

"Time-Triggered Protocol TTP/C", 2004, Publisher: TTTECH Computertechnik GmbH, Published in: Austria.

Wensley et al., "The Design, Analysis, and Verification of the SIFT Fault Tolerant System", "Proceedings of Conference on Software Engineering", 1976, pp. 458-469, Publisher: IEEE Computer Society Press.

Yeh, "Design Condiserations in Boeing 777 Fly-by-Wire Computers", "High-Asssurance Systems Engineering Symposium", Nov. 1998, pp. 64-72, Publisher: IEEE.

Yeh, "Triple-Triple Redundant 777 Primary Flight Computer", "Proceedings of the Aerospace Applications Conference", 1996, pp. 293-307, vol. 1, Publisher: IEEE, Published in: New York, NY.

* cited by examiner

SELF-CHECKING PAIR-BASED MASTER/FOLLOWER CLOCK SYNCHRONIZATION

CROSS REFERENCE TO RELATED APPLICATIONS

This application is related to co-pending U.S. patent application Ser. No. 11/010,249, filed on Dec. 10, 2004, entitled "SELF-CHECKING PAIR ON A BRAIDED RING NETWORK", hereby incorporated herein by reference, and referred to herein as the "'249 Application".

This application is related to co-pending U.S. patent application Ser. No. 10/993,933, filed Nov. 19, 2004 entitled "HIGH INTEGRITY DATA PROPAGATION IN A BRAIDED RING", hereby incorporated herein by reference, and referred to herein as the "'933 Application".

This application is related to co-pending U.S. patent application Ser. No. 10/993,936, titled "SYNCHRONOUS MODE BROTHER'S KEEPER BUS GUARDIAN FOR A TDMA BASED NETWORK," filed on Nov. 19, 2004, which is hereby incorporated by reference in its entirety and referred to herein as the "'936 Application.

This application is related to co-pending U.S. patent application Ser. No. 10/993,931 filed Nov. 19, 2004 entitled "UNSYNCHRONOUS MODE BROTHER'S KEEPER BUS GUARDIAN FOR A RING NETWORKS", which is hereby incorporated by reference in its entirety and referred to herein as the "'931 Application.

This application is related to co-pending U.S. patent application Ser. No. 11/537,305, filed on Sep. 29, 2006, entitled "SYSTEMS AND METHODS FOR FAULT-TOLERANT HIGH INTEGRITY DATA PROPAGATION USING A HALF-DUPLEX BRAIDED RING NETWORK", hereby incorporated herein by reference, and referred to herein as the "'9502 Application".

This application is related to co-pending U.S. patent application Ser. No. 11/610,450, filed on even date herewith, entitled "METHODS FOR EXPEDITED START-UP AND CLIQUE AGGREGATION USING SELF-CHECKING NODE PAIRS ON A RING NETWORK", hereby incorporated herein by reference, and referred to herein as the "'0446 Application".

This application is related to co-pending U.S. patent application Ser. No. 11/549,457, filed on Oct. 13, 2006, entitled "CLOCK-STATE CORRECTION AND/OR CLOCK-RATE CORRECTION USING RELATIVE DRIFT-RATE MEASUREMENTS", hereby incorporated herein by reference, and referred to herein as the "'8201 Application".

BACKGROUND

Distributed, fault-tolerant communication systems are used, for example, in applications where a failure could possibly result in injury or death to one or more persons. Such applications are referred to here as "safety-critical applications." One example of a safety-critical application is in a system that is used to monitor and manage sensors and actuators included in an airplane or other aerospace vehicle One architecture that is commonly considered for use in such safety-critical applications is the time-triggered, table driven architecture. In a time-triggered, table driven system, multiple nodes communicate with one another over two replicated high-speed communication channels.

Distributed systems. such as time-triggered table driven systems. need a common notion of time to coordinate activities. In recent years, fault-tolerant clock synchronization has moved towards distributed clock synchronization using simplex source nodes and associated clocks to achieve a common notion of time with associated well-known problems such as Byzantine clock synchronization. These distributed clock synchronization schemes require significant increases in clock synchronization algorithm overheads (about a factor of two in a single fault-tolerant system) to provide sufficient precision to address such problems.

For the reasons stated above and for other reasons stated below which will become apparent to those skilled in the art upon reading and understanding the specification, there is a need in the art for improved clock synchronization systems and methods.

SUMMARY

Systems and methods for network clock synchronization are provided. In one embodiment, a method for clock synchronization in a braided ring network comprises: providing a schedule for a braided ring network comprising a plurality of nodes, wherein at least two nodes comprise a self-checking pair of a first node and a second node, the first node performing a method comprising: determining when a first rendezvous message is received from the second node; when the second rendezvous message is received, calculating a time difference between the send instance of the first rendezvous message and a local time; when the time difference is not greater than a reference bound, calculating a sending point for transmitting a synchronization message, wherein the sending point is calculated based on the time difference; and selectively sending the synchronization message to the braided ring network when the sending point is reached based on the time difference.

DRAWINGS

DETAILED DESCRIPTION

In the following description, various embodiments of the present invention may be described in terms of various computer architecture elements and processing steps. It should be appreciated that such elements may be realized by any number of hardware or structural components configured to perform specified operations. Further, it should be noted that although various components may be coupled or connected to other components within exemplary system architectures, such connections and couplings can be realized by direct connection between components, or by connection through other components and devices located therebetween. The following detailed description is, therefore, not to be taken in a limiting sense.

Instructions for carrying out the various process tasks, calculations, and generation of signals and other data used in the operation of the systems and methods of the invention can be implemented in software, firmware, or other computer readable instructions. These instructions are typically stored on any appropriate computer readable medium used for storage of computer readable instructions or data structures. Such computer readable media can be any available media that can be accessed by a general purpose or special purpose computer or processor, or any programmable logic device.

Suitable computer readable media may comprise, for example, non-volatile memory devices including semiconductor memory devices such as EPROM, EEPROM, or flash memory devices; magnetic disks such as internal hard disks or removable disks (e.g., floppy disks); magneto-optical disks; CDs, DVDs, or other optical storage disks; nonvolatile ROM, RAM, and other like media. Any of the foregoing may be supplemented by, or incorporated in, specially-designed application-specific integrated circuits (ASICs). When information is transferred or provided over a network or another communications connection (either hardwired, wireless, or a combination of hardwired or wireless) to a computer, the computer properly views the connection as a computer readable medium. Thus, any such connection is properly termed a computer readable medium. Combinations of the above are also included within the scope of computer readable media.

Figure 1A:
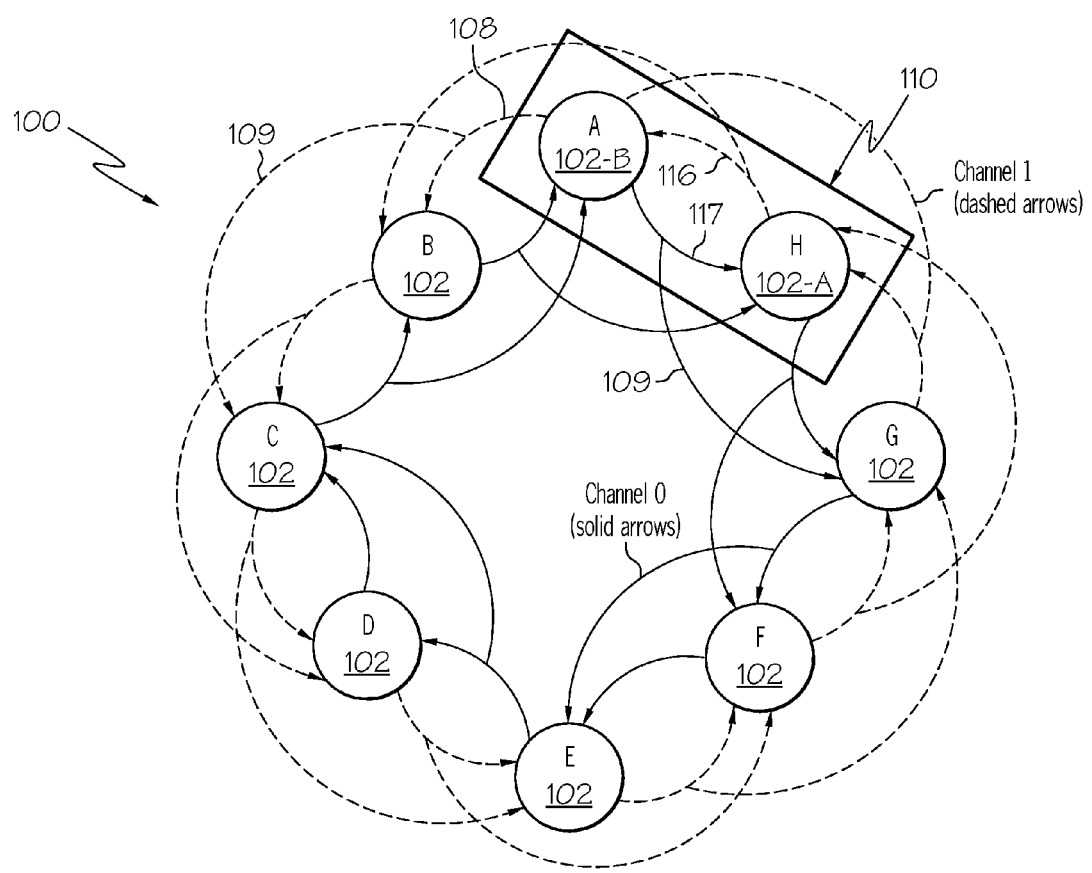
FIG. 1A is a block diagram of a network of one embodiment of the present invention.

FIG. 1A is a block diagram of a bi-directional braided ring communication network 100 of one embodiment of the present invention. Communication network 100 includes multiple nodes 102 that communicate data with each other over a first channel and a second channel formed using multiple point-to-point, unidirectional serial links. As used in this application, the first channel refers to the path traveled by data propagating in the clockwise direction around network 100, while the second channel refers to the path traveled by data propagating in the counter-clockwise direction around network 100.

In the particular embodiment shown in FIG. 1, eight nodes 102 communicate with one another over the two communication channels (shown as Channel 0 and Channel 1). In other embodiments, a different number and/or type of nodes 102 and/or channels and/or a different network topology are used. Embodiments of network 100 are implemented using various media access schemes. For example, the embodiment shown in FIG. 1 is described here as being implemented using a time division multiple access (TDMA) media access. In other embodiments, other media access schemes, such as but not limited to, dynamic mini-slotting are used (for example ARINC 629).

The eight nodes 102 shown in FIG. 1 are also individually labeled in FIG. 1 with the letters "A" through "H" and are referred to here individually as "node A," "node B," and so forth. As used herein, a "neighbor node" (or just "neighbor") is a node that is immediately next to a given node 102 in the network 100. Each node 102 has two "neighbor" nodes 102, one in the clockwise direction (also referred to here as the "clockwise neighbor node" or "clockwise neighbor") and one in the counter-clockwise direction (also referred to here as the "counter-clockwise neighbor node" or "counter-clockwise neighbor"). For example, the neighbor nodes 102 for node A are node B in the clockwise direction and node H in the counter-clockwise direction.

In addition, as used herein, a "neighbor's neighbor node" (or just "neighbor's neighbor") for a given node 102 is the neighbor node 102 of the neighbor node 102 of the given node 102. Each node 102 has two neighbor's neighbor nodes 102, one in the clockwise direction (also referred to here as the "clockwise neighbor's neighbor node" or "clockwise neighbor's neighbor") and one in the counter-clockwise direction (also referred to here as the "counter-clockwise neighbor's neighbor node" or "counter-clockwise neighbor's neighbor"). For example, the two neighbor's neighbor nodes for node A are node C in the clockwise direction and node G in the counter-clockwise direction.

As shown in FIG. 1A, the first channel (that is, Channel 0) interconnects the nodes 102 by propagating data in the clockwise direction around network 100 and the second channel (that is, Channel 1) interconnects the nodes 102 by propagating data in the counter-clockwise direction around network 100. For a given direction in which data flows in a channel, the channel directly communicatively couples (that is, with only one hop) each node 102 to at least two other nodes 102 from which that node 102 receives data and to at least two other nodes 102 to which that node 102 transmits data.

Direct links 108 connect a given node 102 to that node's respective clockwise and counter-clockwise neighbor nodes. The links 109 that connect a given node 102 to that node's respective clockwise and counter-clockwise neighbor's neighbors are referred to here as "skip" links 109.

In the embodiment of network 100 described here, the normal mode comprises at least two modes—an unsynchronized mode and a synchronized mode. When operating in a synchronized mode, the nodes 102 of network 100 are synchronized to a global time base and transmit in accordance with a network communication schedule. The network communication schedule is used to determine when the nodes 102 in the network 100 transmit during a given schedule period or round. During a given schedule period, various nodes 102 in the network 100 are assigned a respective time slot in which to transmit based on the network communication schedule. In other words, for any given time slot, the node 102 assigned to that time slot is allowed to transmit during that time slot (also referred to here as the "scheduled node" 102). In one embodiment, the network communication schedule implements a TDMA access scheme.

To maintain a common notion of time with the nodes 102 of network 100 that is synchronized to the global time base, two of the nodes 102 are implemented as a self-checking pair (illustrated by 110 in FIG. 1A). Self-checking-pair 110 provides synchronization messages over Channel 0 and Channel 1 to the nodes 102 of network 100. These synchronization messages are used by nodes 102 to maintain their own local time clocks in synchronization with the clocks of other nodes of network 100. Synchronous operation of the local clocks of nodes 102 ensure that only nodes assigned by the network schedule to transmit to the network during a particular time slot will do so.

As described herein, self-checking-pair 110 provides synchronization messages which enable the nodes 102 to maintain a common notion of time by providing offset corrections to local time clocks. In one embodiment of the present invention, network start-up and self-checking clique aggregation is further provided to correct TDMA phase alignment, as described in the '450 Application incorporated herein by reference.

Figure 1B:
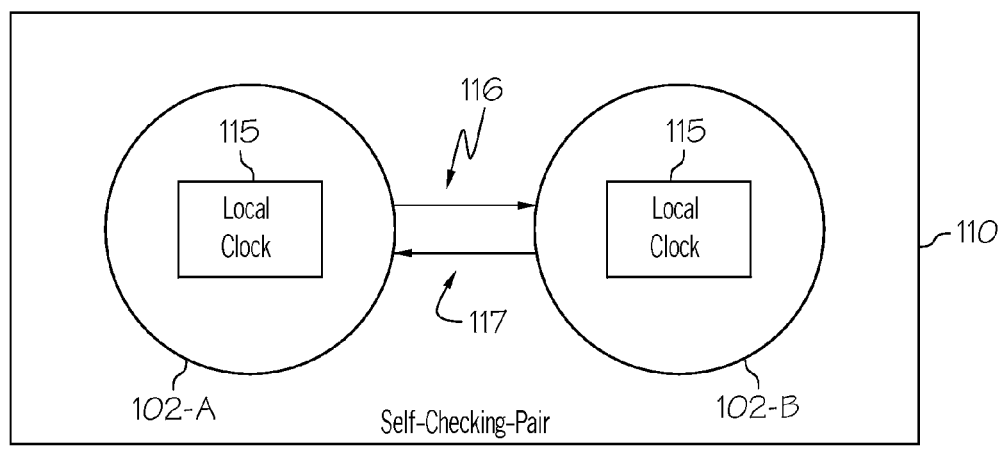
FIG. 1B is a block diagram of a self-checking pair of one embodiment of the present invention

As illustrated in FIG. 1B, self-checking pair 110 includes a synchronizing pair comprising a first node 102-A and a second node 102-B directly coupled together by direct links 116 and 117. Each node of self-checking pair 110 generates synchronization messages used by the nodes 102 of network 100 to synchronize with each other. In the embodiment of FIG. 1A, first node 102-A transmits a counter-clockwise propagating synchronization message via a direct link to node B and a clockwise propagating synchronization message via a skip link to node G. The second node 102-B transmits a clockwise propagating synchronization message via a direct link to node G and a counter-clockwise propagating synchronization message via a skip link to node B. The synchronization messages then propagate around the braided ring of network 100 through the direct links and skip links as described in the '933 Application and the '249 Application, both of which are herein incorporated by reference. In embodiments using full-duplex communication, such as network 100, the synchronization messages travel in opposite directions around the braided ring at the same time. In other embodiments employing half-duplex bi-directional links, the synchronization messages are temporally spaced.

The first node 102-A and the second node 102-B are synchronized together so that each transmits a synchronization message at the same time instance. A rendezvous action is performed between nodes 102-A and 102-B to mutually synchronize the first node 102-A and the second node 102-B together before they start sending synchronization messages to network 100. At a known (a priori) point in time, node 102-A sends its rendezvous message to node 102-B through direct link 116 while node 102-B sends its rendezvous message to node 102-A through direct link 117. In one embodiment, the known point in time is determined by the network communication schedule, such as, but not limited to, a TDMA table. Each of the nodes 102-A and 102-B initiate their own rendezvous action based on their own internal notion of time as regulated by their own local clock 115 and the network communication schedule. The scheduling of rendezvous messages in the network communication schedule provides for a synchronization message periodicity such that any local clock offsets between nodes of network 100 is within the precision parameters required for network 100.

Reception of a rendezvous message by one of nodes 102-A and 102-B from its counterpart node of self-checking pair 110 enables the receiving node to determine the time difference between its own local clock 115 and the local clock 115 of the sending node. Using this difference, the receiving node judges on the correctness of its counterpart node by comparing the determined time difference between local clocks 115 to a known configurable reference bound. Because each node is driven based on its own local clock (i.e., a clock that is independent from the clock used by its counterpart), the comparison acts as a cross-check.

If one node of the self-checking pair 110, first node 102-A for example, determines that the difference between the local clocks 115 does not exceed the reference bound, then node 102-A judges its counterpart node (node 102-B in this example) as correct. In that case, based on the difference between the local clocks 115 and node 102-A's own local time, node 102-A calculates a sending point for transmitting a synchronization message to all of the other nodes 102 of network 100 for synchronization purposes. Similarly, when the second node 102-B also determines that the difference between the local clocks 115 does not exceed the reference bound, then node 102-B judges its counterpart node (node 102-A in this example) as correct. In that case, based on the difference between the local clocks 115 and node 102-B's own local time, second node 102-B also calculates a sending point for transmitting a synchronization message to all of the other nodes 102 of network 100 for synchronization purposes. In other implementations, additional information can be utilized to further determine whether counterpart node is correct, such as, but not limited to, whether state information from the sender of the rendezvous message agrees with corresponding state information of the node receiving the rendezvous message. For example, in one implementation each node of the self-checking pair verifies that the other is using the same network communication schedule version.

Calculation of the sending point is performed by each of nodes 102-A and 102-B in accordance to previously defined rules so that they each will derive a sending point that is closely synchronized in time with the sending point calculated by the other node of self-checking pair 110. The nodes 102-A and 102-B will both start sending their synchronization messages to all of the other nodes 102 of network 100 upon reaching the sending points, thus sending synchronization messages at nearly the same point in time.

As the term is used in this application, a "synchronization message" can be either a dedicated synchronizing message or a non-dedicated synchronizing message. A dedicated synchronizing message is a message transmitted to a network for the sole purpose of providing synchronization information to one or more nodes of the network. A non-dedicated synchronizing message is any message marked for use for synchronizing purposes that also includes non synchronizing related information. In one embodiment of the present invention, any message transmitted to a network by nodes 102-A and 102-B can be utilized as a synchronization message. Network 100 is not limited to a single set of self-checking pairs, but in alternate embodiments can include a plurality of self-checking pairs. In such an embodiment, each set of self-checking pairs synchronize their own local clocks based on synchronization messages from other self-checking pairs.

The nodes 102-A and 102-B will both start sending the synchronization message to all of the other nodes 102 of network 100 upon reaching the sending point only if the calculated difference between their local clocks 115 is less than or equal to the reference bound. If one node of self-checking pair 110 determines that the difference between the local clocks 115 exceeds the reference bound, then that node judges its counterpart node as incorrect and refrains from sending a synchronization message at the sending point.

When both nodes of self-checking pair 110 send synchronization messages at approximately the same point in time, the full-coverage propagation logic in the ring of network 100 assures that each node 102 gets synchronization messages with checked integrity (discussed below), and according to the normal propagation pattern of the ring network as described in the '933 Application and the 249 Application, both of which are herein incorporated by reference. For example, a nearest node 102 will receive the synchronization message one repeat sample behind its upstream neighbor, the neighbor's neighbor will receive the synchronization message two repeat samples behind, and so forth down the channel.

When a received synchronization message is accompanied by a corresponding synchronization message from the synchronization pair, the receiving nodes 102 in network 100 can use the synchronization messages as a reference for synchronizing their own local clocks. When one node of nodes 102-A and 102-B disagrees with its counterpart node, nodes 102 will not receive a synchronization message based on information from that node, indicating to nodes 102 that at least one node of self-checking pair 110 is potentially faulty and cannot be trusted for use as a time reference.

In the embodiment of network 100, the instant of a synchronizing message's send time is used by nodes 102 in network 100 as a reference for setting their own internal clocks. Each of nodes 102 calculate the instant in time at which the synchronization message was transmitted onto network 100 by one of nodes 102-A and 102-B by deducting the propagation time (which is a priori known) from the instant in time at which they receive the synchronization message. In one embodiment, the a priori known propagation delay times between nodes of the network are stored as part of the network communication schedule. For example, when node E receives a synchronization message on channel 0 from node H, node E knows that the synchronization message had to propagate clockwise through node G and node F to arrive at node E. Node E therefore receives the synchronization message two repeat samples behind node G and one repeat sample behind node F. Thus, node E deducts the propagation time associated with two repeat samples from the instant in time it received the synchronization message to determine the instant in time at which the synchronization message was transmitted to channel 0 by node 102-A. Similarly, when node E receives a synchronization message on channel 1 from node A, node E knows that the synchronization message had to propagate counter-clockwise through nodes B, C and D to arrive at node E. Thus, node E knows that the synchronization message was received after a propagation delay of three repeat samples and accordingly deducts the propagation time associated with three repeat samples from the instant in time it received the synchronization message to determine the instant in time at which the synchronization message was transmitted to channel 1 by node 102-B.

In the case were nodes 102-A and 102-B of self-checking pair 110 both judge their counterpart node as incorrect, the result is that no synchronization message is sent from either of node 102-A or node 102-B. In that case, the nodes 102 of network 100 will not receive any synchronization message from self-checking pair 110.

In the case where only one of nodes 102-A and 102-B judges its counterpart node as incorrect only one synchronizing message is sent by the node that deemed its counterpart reliable. In one embodiment, the nodes directly adjacent to the nodes of self-checking pair 110 operate as "guardians" and are configured to only propagate data symbols received via a direct link, during timeslots where self-checking pair 110 are scheduled to send data based on the network communication schedule. Further details regarding the operation of "guardians" are provided in the '936 Application and '931 Application, herein incorporated by reference. Therefore, the guardian node that receives the one synchronizing message via its direct link will propagate the synchronizing message to its neighbor node and neighbor's neighbor node. Meanwhile, the guardian node that receives the one synchronizing message via its skip link will not propagate the synchronizing message. The result is that one synchronizing message will propagate through only one channel of network 100. Accordingly, nodes 102 of network 100 will receive only a single synchronization message which will not be deemed reliable because the synchronization message from one channel was not accompanied by a synchronization message on the other channel.

In contrast, when both nodes 102-A and 102-B of self-checking pair 110 send a synchronization message at approximately the same point in time, each node 102 will get the synchronization messages from both the first and second channels, and the synchronization messages are each thus deemed to have been transmitted from a reliable pair of nodes.

Even when an accurate synchronizing message is transmitted by a node onto a channel of network 100, the possibility exists that the message might become corrupted while propagating through network 100 to the receiving node 102. Therefore, in addition to determining whether a pair of accurate synchronizing messages was originally transmitted by self-checking pair 110, a node 102 of network 100 can also decide whether to trust a received synchronizing message based on the integrity of the synchronizing message as it was received by the node 102.

Determining the integrity of a message propagating through a braided ring network is described in greater detail in the '933 Application and the '249 Application, both of which are herein incorporated by reference. In summary, high-integrity data propagation through a braided ring network is achieved as follows. A message is received on a channel of network 100 with "checked integrity" when a node receives the identical message from both the direct link and skip link of that channel. In that case, in one embodiment, a node then sets an "integrity bit" in the message before continuing propagation of the message around the ring. For example, node E receives a synchronization message on channel 0 with integrity when it receives a synchronization message with checked integrity on the direct link from node F and an identical synchronization message with checked integrity on the skip link from node G. Similarly, node E receives a synchronization message on channel 1 with integrity when it receives a synchronization message with checked integrity on the direct link from node D and an identical synchronization message with checked integrity on the skip link from node C. An absence of integrity may also be indicated by the reception of a truncated message.

When node E receives a synchronization message on channel 0 and a corresponding synchronization message on channel 1, both marked with integrity, node E can assume that accurate synchronization messages were transmitted onto network 100 by both nodes of self-checking pair 110, and further assume that it has received the pair of synchronization messages uncorrupted. In this case, node E can use the synchronization messages to correct its local clock as described above.

When node E receives a synchronization message on only one of channel 0 or channel 1 with marked integrity, node E can also use the synchronization messages to correct its local clock because the synchronization message received with integrity incorporates the behavior of both halves of the self-checking pair 110.

When node E receives only a single synchronization message on either one of channel 0 or channel 1 without marked integrity, node E assumes that an accurate synchronization message was not transmitted onto network 100 by one of node 102-A or 102-B and will not use the single synchronization message to correct its local clock.

In the case where node E receives synchronization messages on both channel 0 and channel 1, and neither is marked with integrity, node E can assume that accurate synchronization messages were initially transmitted onto network 100 by nodes 102-A and 102-B, and that integrity reconstitution (described in greater detail below) may be possible. When integrity reconstitution is possible, node E can use the synchronization messages to correct its local clock as described above.

As previously mentioned, synchronization message provided by self-checking pair 110 can be either dedicated synchronizing messages or non-dedicated synchronizing message. A dedicated synchronizing message is a message transmitted to a network for the sole purpose of providing synchronization information to one or more nodes of the network. A non-dedicated synchronizing message is any message marked for use for synchronizing purposes that also includes non synchronizing related information.

In alternate embodiments, other types of links are used to implement direct link and skip link. For example, in one such other embodiment, bidirectional links are used and the devices, systems, and techniques described here are performed for each direction in which communications occur. In case of bidirectional links, each link is able to send messages in only one direction at any one time. Accordingly, the sending of synchronization messages on channel 0 and channel 1 must be temporally shifted. For example, in one half-duplex network with bidirectional links, a first synchronization message is first sent clockwise around the network on channel 0 by one of the self-checking pair. Then, a second synchronization message is sent counter-clockwise around the network on channel 1 by the other of the self-checking pair. In one such embodiment, a receiving node waits for a pre-determined period of time after receiving the first synchronization message for the reception of the second synchronization message, before it calculates any corrections.

Figure 2:
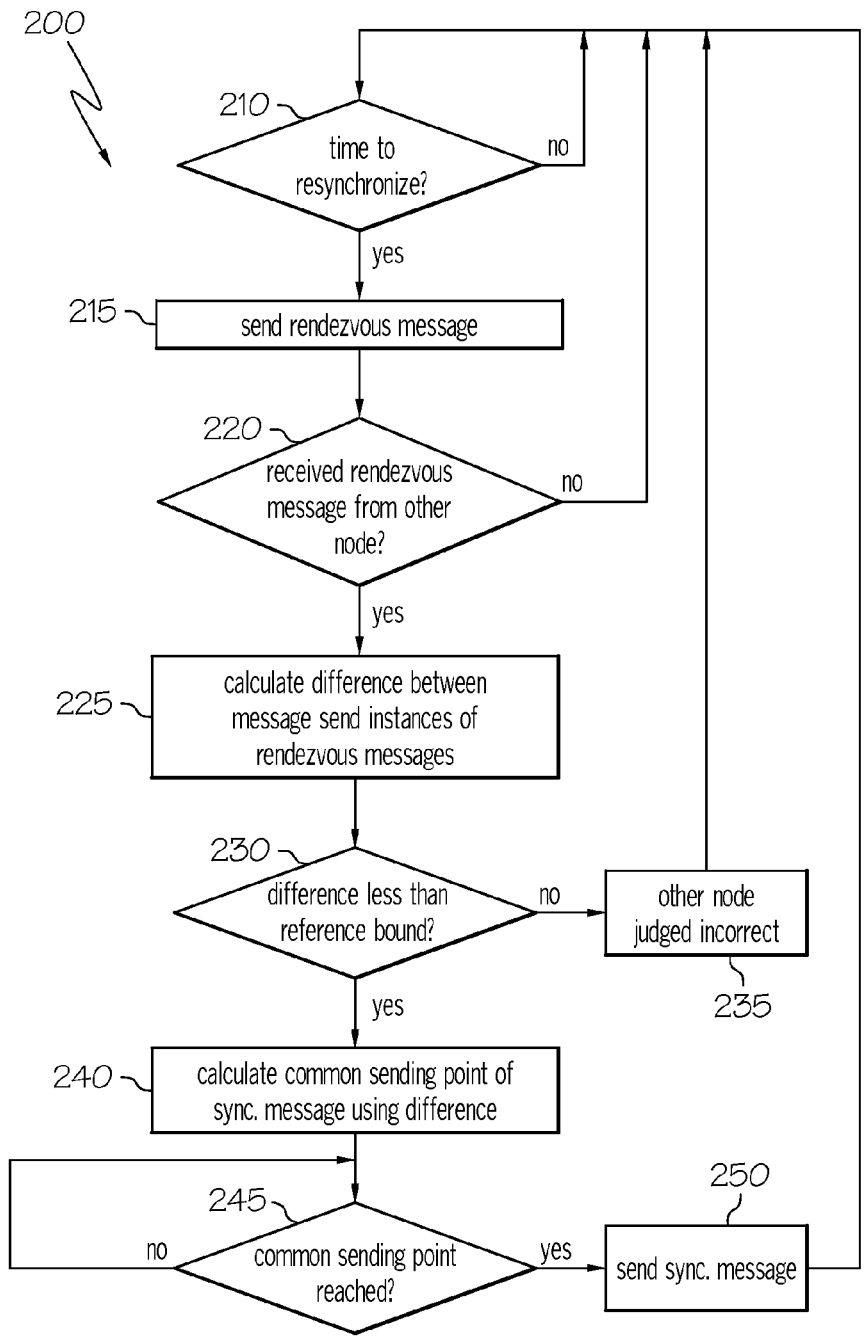
FIG. 2 is a flow chart of a method of one embodiment of the present invention

FIG. 2 is a flow chart illustrating a method for transmitting a synchronization message as executed by one node of a self-checking pair, such as nodes 102-A and 102-B described with respect to FIGS. 1A and 1B above. The method begins at 210 with determining whether it is time for a node of a self-checking pair to resynchronize. In one implementation, a node determines when it is time to resynchronize based on a network transmission schedule. When it is time to resynchronize, the method proceeds to 215 with sending a rendezvous message to a counterpart node of the self-checking pair. The method next proceeds to 220 with determining whether a rendezvous message was received from the counterpart node. When no rendezvous message is received (checked at 220) from the counterpart node, the method returns to 210 and waits until it is again time to resynchronize. When this occurs, the result is that a synchronizing message is not generated during this cycle by the node executing this method.

When a rendezvous message is received (checked at 220) from the counterpart node, the method proceeds to 225 with calculating the difference between the message send instances (in other words, the difference between the rendezvous message transmission times). This difference represents the difference in local time between the one node of the self-checking pair and its counterpart node. When this difference is larger than a reference bound (checked at 230) the method proceeds with 235 and the node judges the counterpart node as incorrect. When the counterpart node is judged incorrect, the method returns to 210 and waits until it is again time to resynchronize. When this occurs, the result is that a synchronizing message is not generated during this cycle by the node executing this method.

When the difference is less than (or equal to) the reference bound (checked at 230), the method proceeds to 240 and calculates a common sending point for transmitting a synchronization message, based on the difference. When the common sending point is reached (checked at 245), the method proceeds to 250 and sends the synchronization message. With each node of a self-checking pair independently executing the method described in FIG. 2, the common sending point is calculated by each node so that synchronization message transmissions will occur at approximately the same point in time. The method then returns to 210 and waits until it is again time to resynchronize.

If a synchronization message from one node of the self-checking pair is accompanied by a corresponding synchronization message from the other node of the self-checking pair, network nodes use the synchronization messages as a reference for synchronizing their own local clocks. Synchronization messages are considered reliable by a network node only if the node receives synchronization messages from both of the nodes of the self-checking pair. When one node of the self-checking pair disagrees with its counterpart node, the network nodes will not receive synchronization messages from both of nodes 102-A and 102-B. This indicates that one of the nodes is potentially faulty and cannot be trusted for use as a time reference.

In the embodiment of network 100, the instant of a synchronizing message's send time is used by nodes 102 in network 100 as a reference for setting their own internal clocks. The instant in time at which the synchronization message was transmitted onto network 100 by one of nodes 102-A and 102-B can be determined by deducting a propagation time (which is a priori known) from the instant in time at which the receiving node 102 received the synchronization message. In one implementation, receiving nodes 102 can average the send times of synchronization messages received from different channels, when they receive both synchronization messages from the nodes 102-A and 102-B, to determine an averaged send instance. The averaged send instance can then be used by nodes 102 to synchronize their own internal times (for example, by correcting a local reference clock).

In one implementation, nodes 102 of network 100 perform an instantaneous correction (also known as a "dead-bang" correction) of their local reference clocks based on the averaged send instance of the synchronization messages. In one implementation, nodes 102 instantaneously adjust their local reference clocks to the average sending instance plus a known node-specific delay constant to account for the propagation delay of a synchronizing message through network 100. Each receiving node 102's node-specific delay constant represents the know propagation delay for messages sent from the synchronization nodes 112-113 to reach that specific node. In one embodiment, the a priori known propagation delay times between nodes of the network are stored as part of the network communication schedule. In another implementation, rather than utilizing a "dead-bang" correction, a calculated correction term is used to incrementally correct a local reference clock over a period of time. In such an implementation, the node applies multiple corrections that are each smaller than the total offset between the local clock and the correct reference time based on the synchronizing messages. The multiple corrections are applied over a period of time, not to exceed the period when the next set of synchronization messages and the next correction is expected. In each case the correction can start immediately after the reception of the synchronization messages.

Figure 3:
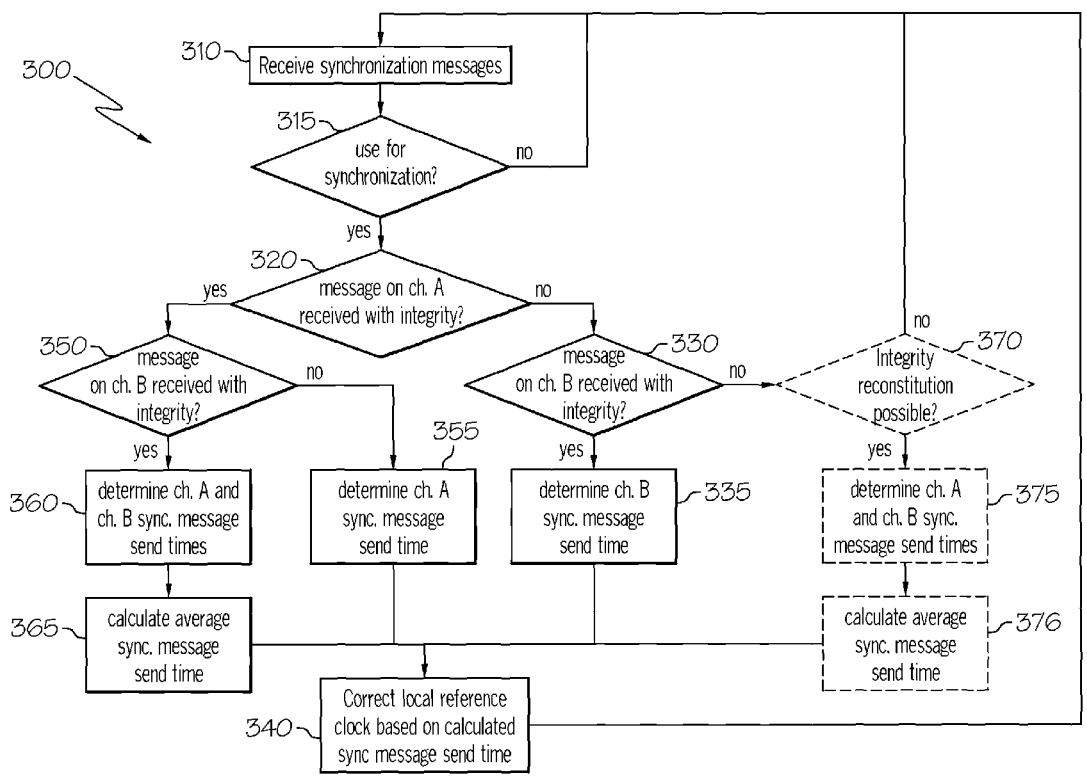
FIG. 3 is a flow chart of a method of one embodiment of the present invention.

FIG. 3 is a flow chart illustrating a method of one embodiment of the present invention for synchronizing a receiving node, such as one of nodes 102 on network 100, based on the integrity of a pair of synchronization messages received by the node. The method begins at 310 with receiving synchronization messages from a self-checking pair, one through each channel of the network. The method proceeds to 315 with determining whether to use the synchronization messages for synchronization. For example, in one embodiment of the method, a receiving node may selectively use synchronization messages from a specific self-checking pair on the network, and ignore synchronization messages from other self-checking pairs. In other implementations, receiving nodes may selectively use synchronization messages based on other criteria, such as but not limited to the network communication schedule.

The method proceeds to 320 with checking if a synchronization message received on a first channel was received with integrity. When the synchronization message received on the first channel is received with integrity, the method proceeds to 350 with checking if the synchronization message received on a second channel was received with integrity. If not the method proceeds to 355 and determines the message send time of the synchronization message received on the first channel. The method then proceeds to 340 and the receiving node corrects its local reference clock based on the calculated message send time. In one implementation, the method instantaneously resets the local reference clock based on the calculated message send time plus an a priori known network propagation delay time.

Returning to 350, when the synchronization message received on the second channel is also received with integrity, the method proceeds to 360 with determining the message send time of the synchronization message received on the first channel and calculating the message send time of the synchronization message received on the second channel. The method then proceeds to 365 with calculating a message send time based on a function (the average, for example) of the message send times of the synchronization messages received on the first and second channels. The method then proceeds to 340 and the receiving node corrects its local reference clock based on the calculated averaged message send time. In one implementation, the method instantaneously resets the local reference clock based on the calculated message send time plus an a priori known network propagation delay time. In another implementation, rather than utilizing a "dead-bang" correction, a calculated correction term is used to incrementally correct a local reference clock over a period of time. In such an implementation, the node applies multiple corrections that are each smaller than the total offset between the local clock and the correct reference time based on the synchronizing messages. The multiple corrections are applied over a period of time, not to exceed the period when the next set of synchronization messages and the next correction is expected.

Returning to 320, if the synchronization message received on the first channel was not received with integrity, the method proceeds to 330 with checking if a synchronization message received on a second channel was received with integrity. In the case where a synchronization message is received on the second channel with integrity the method proceeds to 335 and determines the message send time of the synchronization message received on the second channel. The method then proceeds to 340 and the receiving node corrects its local reference clock based on the calculated message send time. In one implementation, the method instantaneously resets the local reference clock based on the calculated message send time plus an a priori known network propagation delay time.

In one embodiment, when the synchronization message received on the first channel was not received with integrity and the synchronization message received on a second channel was not received with integrity neither, the method returns to 310 and waits for another pair of synchronization messages to arrive.

In an alternate embodiment, when the synchronization message received on the first channel was not received with integrity and the synchronization message received on the second channel was not received with integrity, the method proceeds to 370 to determine if integrity reconstitution is possible. Integrity reconstitution is possible when the synchronization message received on the first channel agrees (for example, is bit-for-bit identical) with the synchronization message received on the second channel despite the fact that neither synchronization message is marked with integrity. In addition, integrity reconstitution of a synchronization message should only proceed if it is verified that the synchronization message received on the first channel and the synchronization message received on the second channel do not stem from a single node of the self-checking pair.

In one embodiment, a receiving node determines whether of not a message stems from a single node based on ensuring the authentication of the message sending node. Authentication can be achieved by a counter that is part of the message that starts with 0 from the sending node and is increased by 1 for each direct link or by two for each skip link as the message propagates. A node receiving two frames without integrity can use the two messages for integrity reconstitution, and for time base correction, if the sum of the counters for the messages is equal to N−1 where N is the number of nodes in the braided ring network. This ensures that the messages stem from two adjacent nodes and cannot be from a single node. In one alternative to authentication, clock synchronization pairs can enforce unique synchronization message IDs by blocking messages with invalid IDs. For the latter approach a message sent by a single node will not propagate through a channel in one direction and, thus, integrity reconstitution mechanism will not work because receiving end nodes will only receive one synchronization message with integrity set as invalid. The second invalid frame has been blocked by at least one of the self-checking pair clock synchronization nodes.

When integrity reconstitution is possible, the method proceeds to 375 to determine the message send time of the synchronization message received on the first channel and the message send time of the synchronization message received on the second channel. The method then proceeds to 376 with calculating message send time based on a function (the average, for example) of the message send times of the synchronization messages received on the first and second channels. The method then proceeds to 440 and the receiving node corrects its local reference clock based on the calculated average message send time. In one implementation, the method instantaneously resets the local reference clock based on the calculated message send time plus an a-priori known network propagation delay time.

Returning to 370, when integrity reconstitution is not possible because the synchronization message received on the first channel does not agree with the synchronization message received on the second channel, the method returns to 310 and waits for another pair of synchronization messages to arrive.

In alternate implementations, the local reference clock correction performed at 440 can either be performed based on synchronization messages from any self-checking pair on the network, or only when synchronization messages are received from selected ("master") self-checking pairs. A master self-checking pair need not be the same synchronization pair at each point in time. For example, in one implementation that comprises master self-checking pairs, a receiving node executing the method of FIG. 3 selects self-checking pairs according to an a priori agreed selection scheme, a scheme where a plurality of correctly agreeing self-checking pairs are used, or based on a dynamic selection scheme (such as an encoded a priori defined priority field in the synchronization message or network communication schedule). The selection scheme can account for the quality of the clocks for different self-checking pair (for example, a clock's tendency to drift with respect to absolute time) enabling the selecting of the a priori known most accurate reference clocks and selecting lesser performing clocks in case of failure of the most accurate reference clocks.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method for clock synchronization in a braided ring network comprising a plurality of nodes, wherein at least two nodes of the plurality of nodes comprise a self-checking pair of a first node and a second node, the method comprising:

determining at the first node when a first rendezvous message is received from the second node;
when the first rendezvous message is received from the second node, calculating at the first node a time difference between a send instance of the first rendezvous message and a local time;
when the time difference is not greater than a reference bound, calculating at the first node a common sending point for transmitting a first synchronization message, wherein the common sending point is calculated based on the time difference so that the first synchronization message is transmitted at approximately the same point in time as a second synchronization message transmitted from the second node; and
selectively sending the first synchronization message from the first node to at least one node in the braided ring network other than the second node when the common sending point is reached based on the time difference.

2. The method of claim 1 further comprising:
determining at the first node when it is time to resynchronize with the second node based on the network communication schedule; and
sending from the first node a second rendezvous message to the second node.

3. The method of claim 1, wherein when the time difference is greater than the reference bound, selectively sending the first synchronization message further comprises:
refraining from sending the first synchronization message when the common sending point is reached.

4. The method of claim 1, further comprising:
receiving at the at least one node one or both of the first synchronization message on a first channel of the network and the second synchronization message from the second node on a second channel of the network; and
setting a local reference time at the at least one node based on one or both of the first synchronization message and the second synchronization message.

5. The method of claim 4, wherein setting the local reference time further comprises one of:
performing an instantaneous correction to the local reference time; and
incrementally correcting the local reference time over a period of time.

6. The method of claim 1 further comprising:
propagating the first synchronization message around the braided ring network based on high-integrity data propagation.

7. The method of claim 6, wherein when the first synchronization message is received at the at least one node with integrity and the second synchronization message from the second node is received with integrity at the at least one node, the method further comprises:
determining at the at least one node a first message send time of the first synchronization message;
determining at the at least one node a second message send time of the second synchronization message;
calculating at the at least one node a third message send time based on a function of the first message send time and the second message send time; and
setting at the at least one node a local reference time based on the third message send time.

8. The method of claim 6, wherein when the first synchronization message is received with integrity at the at least one node and the second synchronization message from the second node is received at the at least one node without integrity, the method further comprises:

determining at the at least one node a first message send time of the first synchronization message; and
setting a local reference time at the at least one node based on the first message send time.

9. The method of claim 6, wherein when the first synchronization message is received at the at least one node without integrity and the second synchronizing synchronization message from the second node is received at the at least one node without integrity, the method further comprises:
determining at the at least one if the first synchronization synchronizing message agrees with the second synchronization synchronizing message;
verifying at the at least one node that the first synchronization synchronizing message and the second synchronization synchronizing message do not originate from a single node;
determining at the at least one node a first message send time of the first synchronization message;
determining at the at least one node a second message send time of the second synchronization message;
calculating at the at least one node a third message send time based on a function of the first message send time and the second message send time; and
setting a local reference time at the at least one node based on the third message send time.

10. A synchronizing system for a network, the system comprising:
a first node having a first local clock, the first node communicatively coupled to a first channel of the network;
a second node having a second local clock, the second node communicatively coupled to a second channel of the network;
at least one link communicatively coupling the first node to the second node, wherein the first node and the second node transmit rendezvous messages to each other over the at least one link;
wherein the first node determines when a rendezvous message is received from the second node, and determines a first time difference between the first local clock and the second local clock based on a send time instance of the rendezvous message from the second node;
wherein the first node calculates a first common sending point for transmitting a first synchronization message to at least one node other than the second node on the first channel based on the first time difference;
wherein the second node determines when a rendezvous message is received from the first node, and determines a second time difference between the first local clock and the second local clock based on a send time instance of the rendezvous message from the first node; and
wherein the second node calculates a second common sending point for transmitting a second synchronization message to at least one node other than the first node on the second channel based on the second time difference;
wherein the first common sending point and the second common sending point are calculated so that the first synchronization message is transmitted at approximately the same point in time as the second synchronization message.

11. The system of claim 10, wherein when the first time difference is less than a reference bound, the first node transmits the first synchronization message when the first common sending point is reached; and
wherein when the second time difference is less than the reference bound, the second node transmits the second synchronization message when the second common sending point is reached.

12. The system of claim 10, wherein when the first time difference is not less than the reference bound, the first node refrains from transmitting the first synchronization message; and wherein when the second time difference is not less than the reference bound, the second node refrains from transmitting the second synchronization message.

13. The system of claim 10, wherein the first node further determines the first time difference between the first local clock and the second local clock based on a difference in the send time instance of the rendezvous message from the second node and a rendezvous message sent by the first node; and wherein the second node further determines the second time difference between the first local clock and the second local clock based on a difference in the send time instance of the rendezvous message from the first node and a rendezvous message sent by the second node.

* * * * *